(12) United States Patent
Sawamura et al.

(10) Patent No.: US 6,685,322 B2
(45) Date of Patent: Feb. 3, 2004

(54) OPTICAL SYSTEM AND PROJECTION-TYPE IMAGE DISPLAY DEVICE

(75) Inventors: Shigeru Sawamura, Osaka (JP); Katsuhiro Takamoto, Osaka (JP); Katsunari Fujiki, Osaka (JP)

(73) Assignee: Minolta Co., Ltd., Osaka (JP)

( * ) Notice: Subject to any disclaimer, the term of this patent is extended or adjusted under 35 U.S.C. 154(b) by 19 days.

(21) Appl. No.: 09/906,267

(22) Filed: Jul. 16, 2001

(65) Prior Publication Data

US 2002/0015136 A1 Feb. 7, 2002

(30) Foreign Application Priority Data

Aug. 4, 2000 (JP) ........................................ 2000-236430

(51) Int. Cl.⁷ .......................... G03B 21/00; G03B 21/28
(52) U.S. Cl. ........................................... 353/33; 353/81
(58) Field of Search .............................. 353/33, 34, 82, 353/81, 121, 122

(56) References Cited

U.S. PATENT DOCUMENTS

| | | | | |
|---|---|---|---|---|
| 6,147,802 A | * | 11/2000 | Itoh et al. | 349/194 |
| 6,179,424 B1 | | 1/2001 | Sawamura | 353/33 |
| 6,185,047 B1 | | 2/2001 | Peterson et al. | 359/640 |
| 6,250,763 B1 | * | 6/2001 | Fielding et al. | 353/33 |
| 6,457,830 B1 | * | 10/2002 | Choi | 353/33 |

* cited by examiner

Primary Examiner—Russell Adams
Assistant Examiner—Andrew Sever
(74) Attorney, Agent, or Firm—Sidley Austin Brown & Wood LLP

(57) ABSTRACT

An optical system includes a first prism having a first surface and a second surface forming an acute angle therebetween, and a second prism having a third surface. The first prism and the second prism form an air gap between the second surface and the third surface. The air gap formed by the second surface and the third surface has a cross section perpendicular to the first surface and the second surface which is a wedge shape which is wide at a part thereof near the first surface and narrower at a part thereof more distant from the first surface.

8 Claims, 8 Drawing Sheets

US 6,685,322 B2

OPTICAL SYSTEM AND PROJECTION-TYPE IMAGE DISPLAY DEVICE

RELATED APPLICATION

This application is based on Patent Application No. 2000-236430 filed in Japan, the content of which is hereby incorporated by reference.

BACKGROUND OF THE INVENTION

1. Field of the Invention

The present invention relates to an optical system comprising a plurality of prisms, and to a projection-type image display device provided with this optical system.

2. Description of the Related Art

There are projection-type image display devices which direct illumination light to a reflection-type display element, modulate the illumination light by a projection image displayed on the display element, and display the projection image on a screen by projecting the reflected modulation light through a projection optical system. Reflection-type liquid crystal displays (LCD), or digital micro mirror devices™ (DMD™, both DMD ™ and digital micro mirror devices™ are trademarks of Texas Instruments) are used as the display element.

A reflection-type LCD modulates illumination light entering from an approximately perpendicular direction via a liquid crystal layer displaying the projection image, and reflects the image in an approximately perpendicular direction. A DMD™ has micro mirror elements of variable directionality arranged in a plurality of rows on a plane. The direction of each mirror element is alternatively selectable from among two specified directions, which are selected in accordance with the displayed image. Illumination light comprises light of a displayed projection image reflected in one direction and modulated light of an undisplayed projection image reflected in another direction. The range of variance of direction of the mirror elements is very slight at the micro level, and the DMD™ receives illumination light from a near-perpendicular direction, and reflects light in a second near-perpendicular direction.

In this way illumination light of modulated light from one direction must be directed to the display element in a projection-type image display device which modulates illumination light by a reflection-type display element. Accordingly, an optical system for directing illumination light to the display element without blocking the modulated light must be arranged medially to the display element and the projection optical system, and an optical system comprising a plurality of prisms is often used for this purpose.

An example of a conventional optical system is shown in FIG. 7. Parts (a) and (b) of FIG. 7 represent mutually intersecting cross section views of an optical system 50. The optical system 50 comprises two prisms 51 and 52. Prism 51 has three surfaces 51a, 51b, and 51c, and the surfaces 51a and 51b form an acute angle therebetween. Prism 52 also has three surfaces 52a, 52b, and 52c, and the surfaces 52a and 52b form an acute angle therebetween.

Prisms 51 and 52 are arranged such that surface 51b confronts surface 52b with an interval of a small distance therebetween. That is, a small air gap $G_P$ is formed between surface 51b and surface 52b. Surface 51b and surface 52b are mutually parallel, and the size (thickness) of the air gap $G_P$ is constant regardless of position.

The angle formed by the surfaces 51a and 51b of the prism 51 and the angle formed by the surfaces 52a and 52b of the prism 52 are equal to each other, and, accordingly, the surfaces 51a and 52a are parallel. An optical axis perpendicular to the surface 51a of prism 51 is referred to as optical axis Ax of the optical system 50. A display element is arranged perpendicularly to the optical axis Ax on the surface 51 a side of the optical system 50, and a projection optical system is arranged such that the optical axis of the projection optical system is parallel to the optical axis Ax on the surface 52a side of the optical system 50. Accordingly, the air gap $G_P$, and the surfaces 51b and 52b, forming this air gap $G_P$, are oblique to the optical axis of the projection optical system.

The direction of the optical axis Ax is referred to as the X direction, the direction perpendicular to the optical axis Ax within a plane perpendicular to the air gap $G_P$ is referred to as the Y direction, and the direction perpendicular to the optical axis Ax within a plane parallel to the air gap $G_P$ is referred to as the Z direction. Part (a) of FIG. 7 represents the cross section in the X-Y plane, and part (b) of FIG. 7 represents the cross section in the X-Z plane.

The light for illuminating the display element passes through the surface 51c of the prism 51 in the optical system 50. The light passing through the surface 51c [and entering] enters the prism 51 and reaches the surface 51b. The incidence angle of light on the surface 51b is set so as to exceed the critical angle, and the light is completely reflected by the surface 51b. The light completely reflected by the surface 51b reaches the surface 51a, is transmitted through the surface 51a, and impinges the display element approximately perpendicularly thereto.

Light impinging the display element is modulated and reflected by the projection image displayed on the display element. The modulated reflected light impinges the surface 51a, and passes through the prism 51, reaching the surface 51b. The entrance angle of this light on the surface 51b is less than the critical angle, and the light is transmitted through the surface 51b, crosses the air gap $G_P$, and impinges the surface 52b of the prism 52. The light impinging the prism 52 reaches the surface 52a, is transmitted therethrough, impinges the projection optical system, is projected therefrom, and forms a projection image on the screen.

The modulated light is refracted when transmitted through the surfaces 51b and 52b. However, since the surfaces 51b and 52b are parallel, the optical path is also parallel both before passing through surfaces 51b and 52b and after passing through surfaces 51b and 52b. Since the air gap $G_P$ is oblique to the optical axis Ax, the size of the shift in the optical path before transmission through the air gap $G_P$ and after transmission through the air gap $G_P$ is different in the mutually perpendicular Y direction and Z direction. Therefore, although the light has the same point of origin, the origin point in the Y direction is positioned nearer to the projection optical system than the origin point in the Z direction. The shift of the Y direction and Z direction origin points in the optical axis Ax direction is referred to as the interval difference. The origin point in the Z direction is one point, however, the origin point in the Y direction is broadened.

Since the shift of these origin points causes distortion in the image formed by the projected light and reduces the quality of the displayed projection image, this shift must be suppressed as much as possible. For this reason, the size of the air gap is very small, approximately 10 μm in a conventional optical system. FIG. 8 shows the relationship between the amount of defocus and the optical transfer function (OTF) when the size of the air gap $G_P$ is set to this degree. In FIG. 8, the curves marked by the symbols XY and XZ represent the OTF within the XY plane and the XZ plane, respectively. Both the amount of defocus of the horizontal axis or the OTF of the vertical axis is standardized when there is no air gap within the optical system. In FIG. 8, there is no great difference in the OTF of the XY plane and the OTF of the XZ plane, and excellent image forming performance is obtained.

When a color projection image is provided, light from a light source emitting white light is split into red (R), green (G), and blue (B) light, and each color light after splitting is modulated by separate reflection-type display elements. In this case an optical system having two air gaps of constant size are used, and a dichroic film is provided on one surface of each air gap, and, for example, red light is reflected and green light and blue light are transmitted by one dichroic film, and, for example, blue light is reflected and red light and green light are transmitted by the other dichroic film so as to split the red light, green light, and blue light.

Three display elements are provided to display the R component, the G component, and the B component of the projection image. The R light and the B light reflected by the dichroic film are completely reflected by different surfaces of the prism, and are directed to the corresponding display element. The light modulated and reflected by each display element follows the optical path in reverse and is combined within the optical system, and is projected by the projection optical system. In this case also, the size of the air gap is approximately 10 μm, such that an excellent color image is displayed without color shift.

In recent years, extremely high intensity light has been used as illumination light in the optical system in accordance with demand for high luminance projection images. Although each prism of the optical system is manufactured using material of high transmittance, light energy is absorbed and a high temperature is reached, and swelling cannot be avoided. This swelling deforms the surfaces of the prism, and reduces the performance of the prism.

The deformation of the surface opposite the display element and the projection optical system is only somewhat connected to performance reduction. However, when the surfaces forming the air gap are deformed, both surfaces come into contact, and the parts in contact cannot produce complete reflection. When complete reflection cannot be attained, the illumination light cannot be directed to the display element and the optical system does not function.

In a projection-type image display device which displays a bright projection image, the air gap within the optical system is made large so as to prevent contact between the surfaces of the two prisms forming the air gap even when the prisms swell. FIG. 9 shows an optical system 50' in which the air gap is large. Part (a) of FIG. 9 represents the cross section in the X-Y plane, and part (b) of FIG. 9 represents the cross section in the X-Z plane. In this optical system 50', the air gap $G_P$ of the optical system 50 of FIG. 7 is enlarged from approximately 10 μm to approximately 50 μm. When the air gap becomes this large, the shift of the origin point of the light also increases, and the interval difference becomes extremely large.

FIG. 10 shows the relationship between defocus and OTF in the optical system 50'. There is a shift of approximately 0.05 mm in the maximum position of the OTF in the XY plane and the XZ plane, and the quality of the image displayed on the screen is greatly reduced.

Disadvantages accompanying an increase in the air gap in an optical system have long been known. However, simple and effective countermeasures have yet to be proposed. Although it is possible to suppress distortion by using an anamorphic projection optical system, an increase in cost is unavoidable. It becomes necessary to design the projection optical system in accordance with each individual optical system, and interchangeability is lost.

SUMMARY OF THE INVENTION

An object of the present invention is to provide an improved optical system and a projection-type image display device which is provided with this optical system and which is capable of providing a bright, high-quality projection image.

Another object of the present invention is to provide an optical system which is capable of suppressing the difference in the path of light in two directions, and a projection-type image display device which is provided with this optical system and which is capable of providing a bright, high-quality image.

These objects are attained by the present invention, in an optical system including a first prism having a first surface and a second surface forming an acute angle therebetween, and a second prism having a third surface and forming an air gap between the second surface and the third surface, wherein the cross section, perpendicular to the first surface and the second surface, of the air gap formed by the second surface and the third surface has a wedge shape which is wide at a part thereof near the first surface and narrower at a part thereof more distant from the first surface.

BRIEF DESCRIPTION OF THE DRAWINGS

These and other objects and features of this invention will become clear from the following description, taken in conjunction with the preferred embodiments with reference to the accompanying drawings, in which.

DESCRIPTION OF THE PREFERRED EMBODIMENTS

Figure 1:
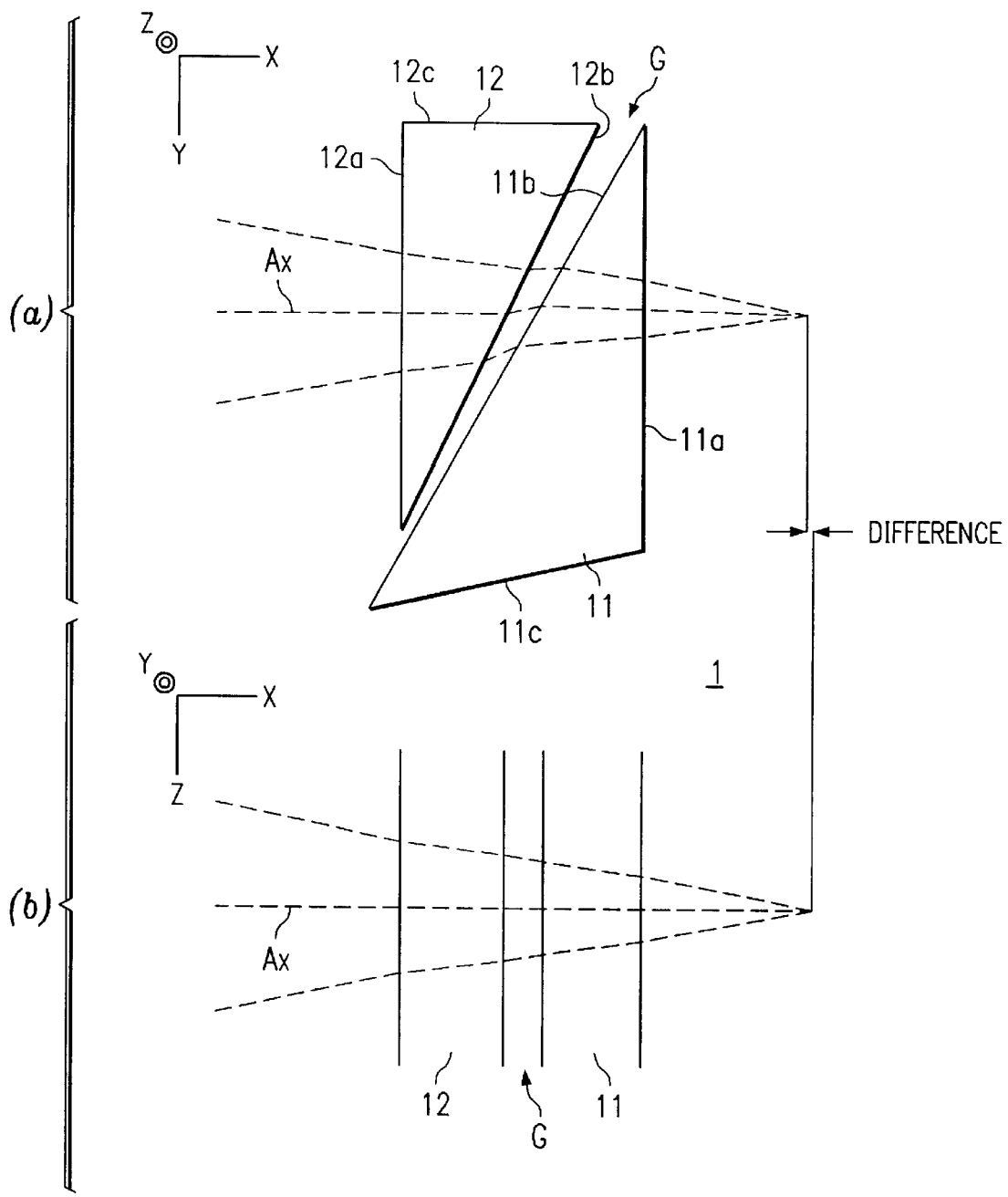
FIG. 1 is a schematic view representing mutually perpendicular cross sections of the structure of an optical system of a first embodiment.

The embodiments of the optical system and projection-type image display device of the present invention are described hereinafter with reference to the accompanying drawings. The structure of the optical system of a first embodiment is schematically shown in FIG. 1. In FIG. 1, parts (a) and (b) represent mutually intersecting cross sections of an optical system 1.

The optical system 1 comprises two prisms 11 and 12. Prism 11 has three surfaces 11a, 11b, and 11c, and the surfaces 11a and 11b form an acute angle therebetween. Prism 12 has three surfaces 12a, 12b, and 12c, and the surfaces 12a and 12b form an acute angle therebetween.

Prisms 11 and 12 are arranged such that surface 11b confronts surface 12b and is separated therefrom by a small distance. That is, surfaces 11b and 12b form an air gap G. Surface 11b and surface 12b are not parallel to each other, and are set so as to have a relatively large distance therebetween at a part thereof nearest the surface 11a, and a relatively small distance therebetween at a part thereof farthest from the surface 11a. Accordingly, the cross section of the air gap G is wedge-shaped having a width separated from the surface 11a.

The surface 11a of the prism 11 and the surface 12a of the prism 12 are approximately parallel to each other. An optical axis perpendicular to the surface 11a of the prism 11 is referred to as the optical axis Ax of the optical system 1. The direction of the optical axis Ax is designated the X direction, a direction perpendicular to the optical axis Ax within a plane perpendicular to the air gap G is designated the Y direction, and a direction perpendicular to the direction of the optical axis Ax within a plane parallel to the air gap G is designated the Z direction. Part (a) represents a cross section in the X-Y plane, and part (b) represents a cross section in the X-Z plane.

The optical paths, before and after light from an object point positioned on the surface 11a side passes through the air gap G, are parallel within the X-Z plane and are not parallel in the X-Y plane due to the wedge shape of the air gap G. Moreover, since the size (thickness) of the air gap G increases as it nears the surface 11a and decreases as it extends away from the surface 11a, the width of the flux in the Y direction impinging the surface 12b after crossing the air gap G is approximately identical to the width in the Z direction. For this reason there is no difference in width in the Y direction and the Z direction, and widening of the origin point of the light in the Y direction is eliminated. Accordingly, even after passing through the prisms 11 and 12, there is no difference produced in the Y direction and the Z direction in the course of the light from the origin point positioned on the surface 11a side.

Figure 2:
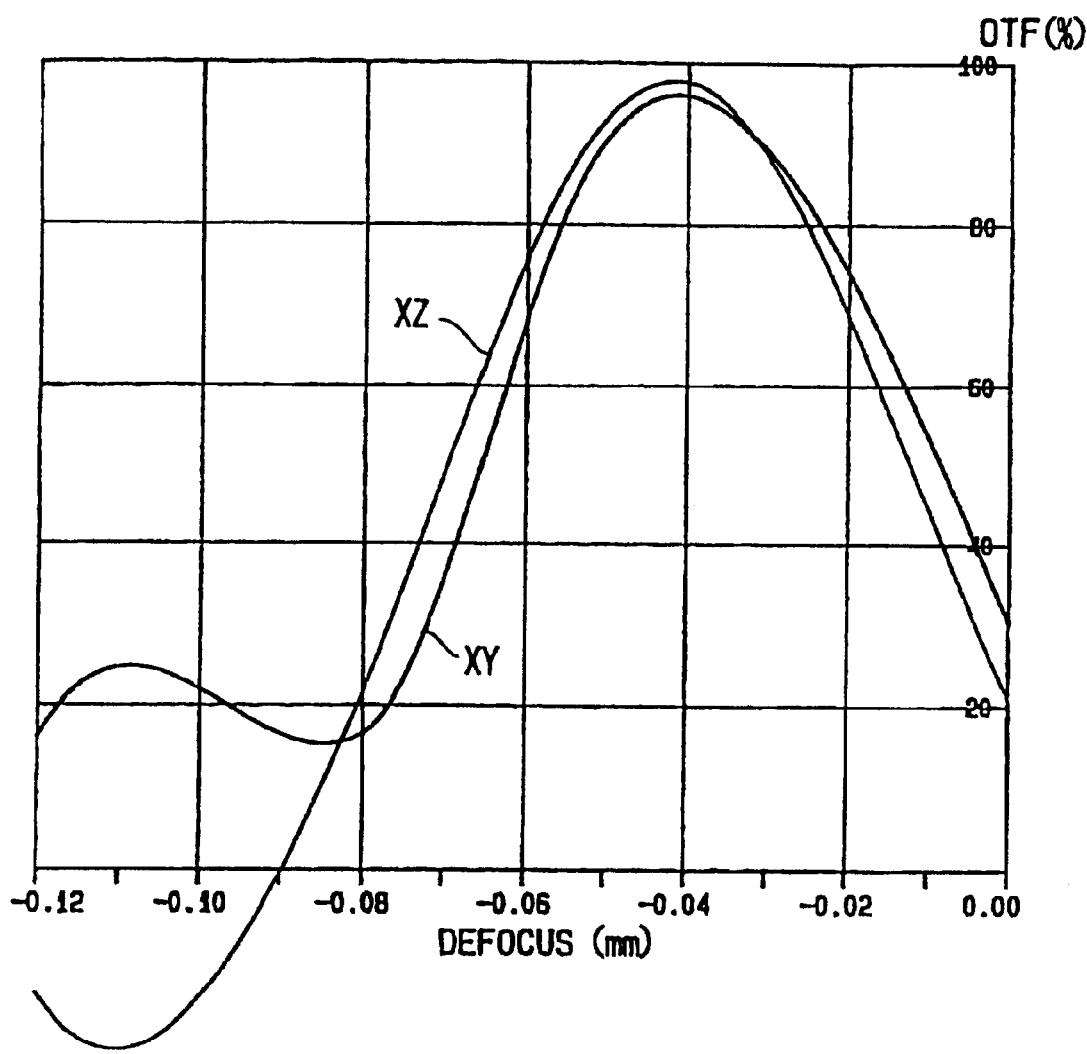
FIG. 2 shows the relationship between the amount of defocus and OTF of the optical system of the first embodiment.

The relationship between the amount of defocus and OTF in the optical system 1 is shown in FIG. 2. The degree of matching of the OTF in the X-Y plane and the X-Z plane is high, and there is no apparent influence of the inclination of the air gap G relative to the optical axis Ax.

The degree of the wedge cross section of the air gap G, i.e., the size of the angle formed by the surface 11b and the surface 12b in a plane perpendicular to the surface 11b and the surface 11a, is determined in accordance with the size of the air gap G and the distance from the object point, positioned on the surface 11a side, to the surface 11a. In a general application, wherein light from the display element is directed to a projection optical system for projection through an optical system, the angle formed by the surface 11b and the surface 12b may be 0.25° or less. In FIG. 1, the angle formed by the surface 11b and the surface 12b is shown large to clarify the wedge shape of the air gap G.

Since the air gap G is wedge-shaped, the optical axis Ax perpendicular to the surface 11a of the prism 1 is not strictly perpendicular to the surface 11a within prism 12. When the surface 12a of the prism 12 is strictly parallel to the surface 11a, the optical axis Ax on the exterior side of the surface 12a is not strictly perpendicular to the surface 11a. In the optical system 1, the degree of the wedge shape of the air gap G is considered when determining the angle formed by the surface 11a and surface 12a such that the optical axis Ax, even on the exterior side of the surface 12a, is perpendicular to the surface 11a. Actually the surface 12a can be said to be parallel to the surface 11a since the angle formed by the surface 11a and the surface 12a is 0.25° or less.

Figure 3:
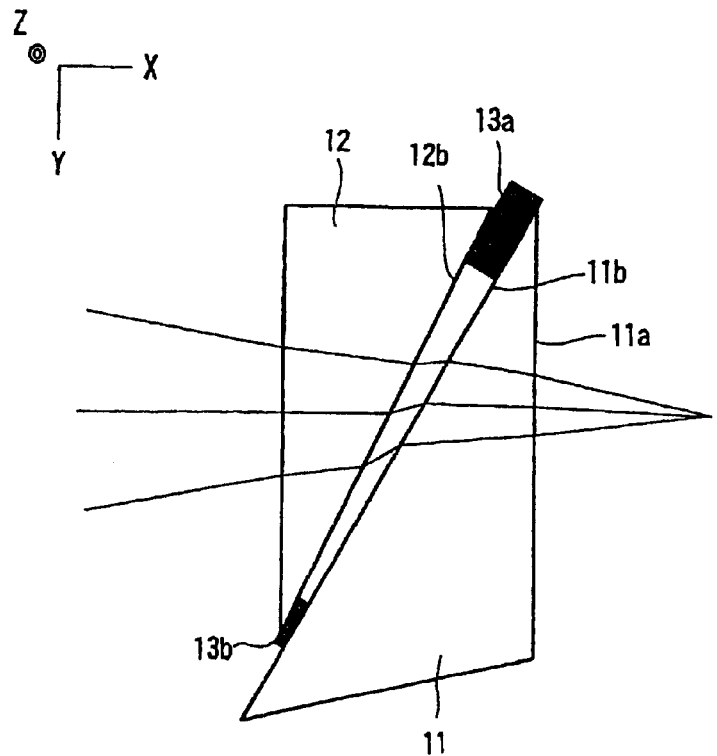
FIG. 3 is a schematic view of an example of a structure having an air gap with a wedge-shaped cross section in the optical system of the first embodiment.

An example of a structure providing the air gap G with a wedge-shaped cross section is shown in FIG. 3. In this case two glass plates 13a and 13b are installed medially to the prisms 11 and 12, and these glass plates 13a and 13b are sandwiched between the surfaces 11b and 12b. The glass plate 13a, located at a part near the surface 11a, is thicker than the glass plate 13b, located at a part farther from the surface 11a, such that the cross section of the air gap G has a wedge shape. The degree of the wedge shape can be set freely by the degree of thickness of the glass plates 13a and 13b, and may be finely adjusted by changing the distance between the glass plates 13a and 13b.

Figure 4:
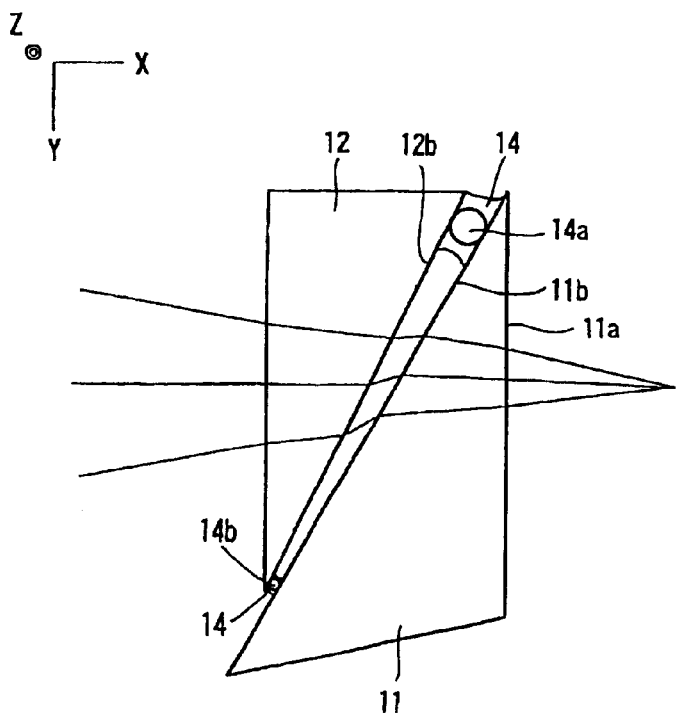
FIG. 4 is another schematic view of an example of a structure having an air gap with wedge-shaped cross section in the optical system of the first embodiment.

Another example of a structure of a wedge-shaped cross section of the air gap G is shown in FIG. 4. In this case glass beads 14a and 14b are adhered to the prisms 11 and 12 by adhesive 14 containing the glass beads, such that the glass beads 14a and 14b are sandwiched between the surfaces 11b and 12b. The glass bead 14a, located at a part nearer the surface 11a, is larger than the glass bead 14b, located at a part farther from the surface 11a, and in this way the cross section of the air gap G is wedge-shaped. In this structure, the prisms 11 and 12 are fixed at the same time the air gap G is formed, which makes the assembly of the optical system 1 extremely easy.

Plate-like member or particles formed of other materials may be used in place of the glass plates 13a and 13b and glass beads 14a and 14b insofar as the materials have small thermal expansion coefficient and excellent thermal resistance. For example, ceramic plates and ceramic particles may be used.

Figure 5:
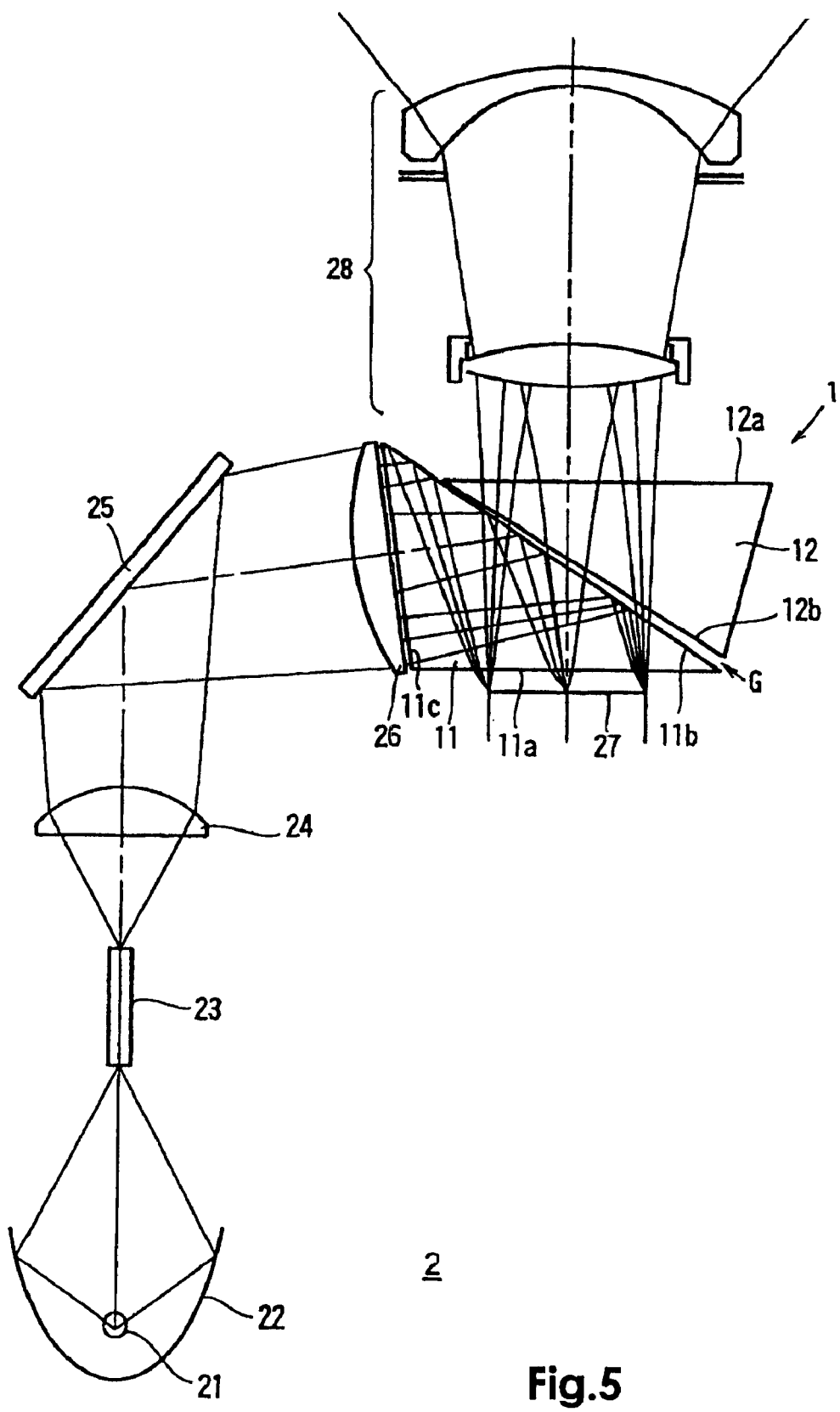
FIG. 5 is a schematic view showing the structure of a projection-type image display device incorporating an optical system of the first embodiment.

The construction of a projection-type image display device 2 is schematically shown in FIG. 5. The projection-type image display device 2 comprises a lamp 21, reflector 22, integrator rod 23, relay lenses 24 and 26, plane mirror 25, optical system 1 of the first embodiment, display element DMD™ 27, and projection optical system 28.

The lamp 21 emits white light to illuminate the DMD™ 27, and the reflector 22 converges the emitted light, which impinges the integrator rod 23. The reflector 22 is a rotating hyperbolic mirror, and the lamp 21 is disposed at a first focus. The entrance end of the integrator rod 23 is disposed at a second focus of the reflector 22, and light emitted from the lamp 21 is converged at the entrance end of the integrator rod 23.

The light entering the integrator rod 23 is completely reflected by the side surfaces and reaches the exit end. The frequency of total reflection by the side surfaces of the integrator rod 23 is dependent on the incidence angle of the light entering the entrance end. Accordingly, the center of the flux from the reflector 22 and peripheral light are mixed at the exit end, such that there is uniform intensity distribution of the light exiting from the integrator rod 23.

The relay lenses 24 and 26 direct the light emitted from the integrator rod 23 to the whole surface of the DMD™ 27, and the mirror 25 reflects the light between the relay lenses 24 and 26 so as to bend the optical path. The exit end of the integrator rod 23 and the DMD™ 27 have a conjugate positional relationship, such that the DMD™ 27 is uniformly illuminated. The mirror 25 is provided to reduce the size of the device, and may be omitted.

Light from the relay lens 26 enters the optical system 1 from the surface 11c. Light passing through surface 11c and entering the prism 11 reaches the surface 11b. The incidence angle of the light on the surface 11b is set so as to exceed the critical angle, and the light is completely reflected by the surface 11b. The light completely reflected by the surface 11b is directed to the surface 11a, passes through the surface 11a, and impinges the DMD™ 27 from a somewhat inclined direction.

The DMD™ 27 is set such that the light representing a projection image, among the reflected light, advances perpendicularly to the surface 11a of the prism 11, i.e., parallel to the optical axis of the optical system 1. The DMD™ 27 is further set such that the light (not shown) not representing a projection image, among the reflected light, advances in a direction upwardly and outwardly toward the side opposite the illumination light, relative to the optical axis of the optical system 1.

Light representing the projection image from the DMD™ 27 passes through the surface 11a, enters the prism 11, and reaches the surface 11b. The incidence angle of the light reaching the surface 11b is less than the critical angle, such that the light passes through the surface 11b, crosses the air gap G, and enters the prism 12 from the surface 12b. The light entering the prism 12 reaches the surface 12a, passes therethrough, and enters the projection optical system 28.

The projection optical system 28 projects light from the optical system 1 toward a screen (not illustrated), and forms an image on the screen to display a projection image. The representing the projection image from the DMD™ 27 also passes through the optical system 1, however, this light does not enter the projection optical system 28.

When a color projection image is displayed by the projection-type image display device 2, a color wheel, provided with color filters for selectively transmitting R light, G light, and B light, is disposed near the entrance end or the exit end of the integrator rod 23, so that the light illuminating the DMD™ 27 can be switched. Furthermore, the DMD™ 27 may display an image corresponding to the illumination light among the R component, the G component, or the B component of the projection image at the same time as the illumination light is switched.

Figure 6A:
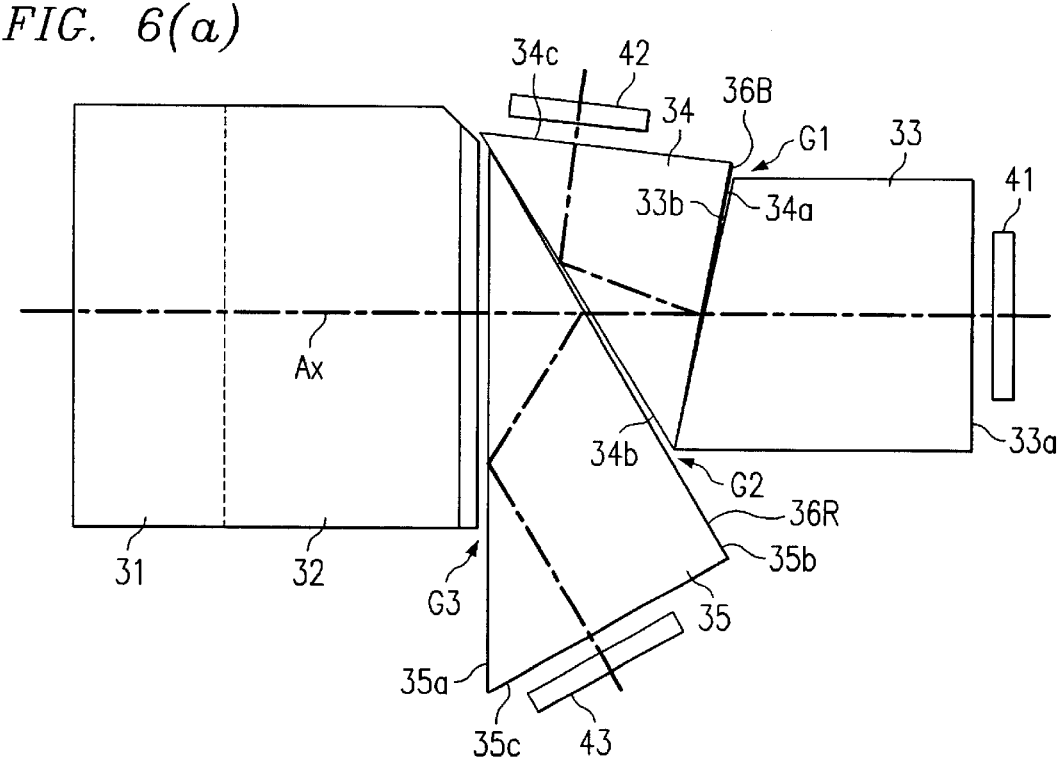
FIG. 6(*a*) is a top view and FIG. 6(*b*) is a side view of a second embodiment of a structure of an optical system as an essential part of a projection-type image display device.
Figure 6B:
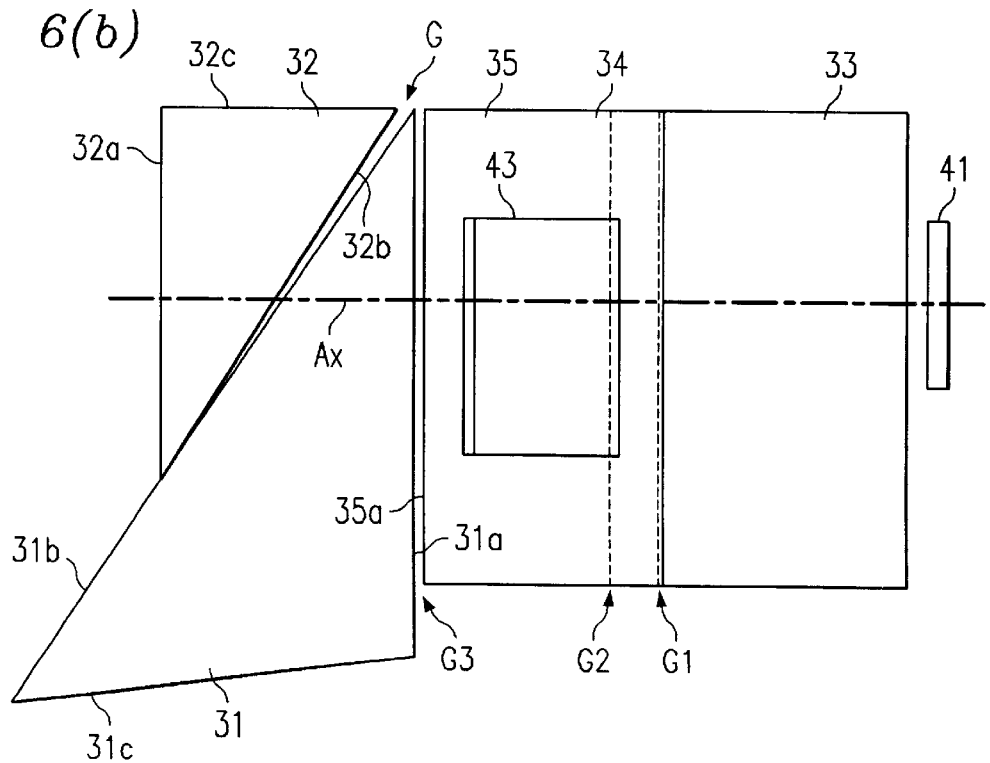
Figure 7:
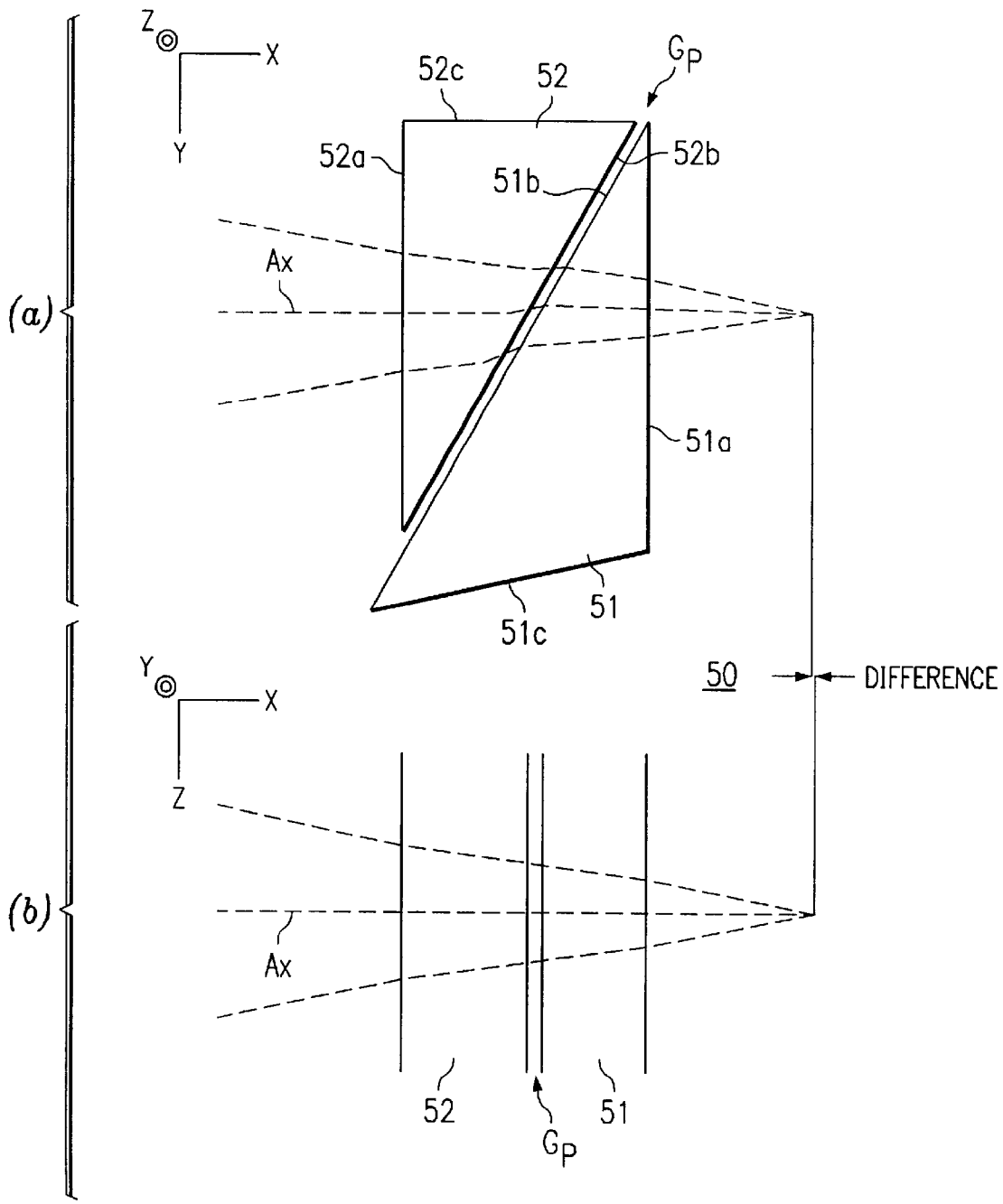
FIG. 7 is a schematic view representing mutually perpendicular cross sections of the structure of a conventional optical system.
Figure 8:
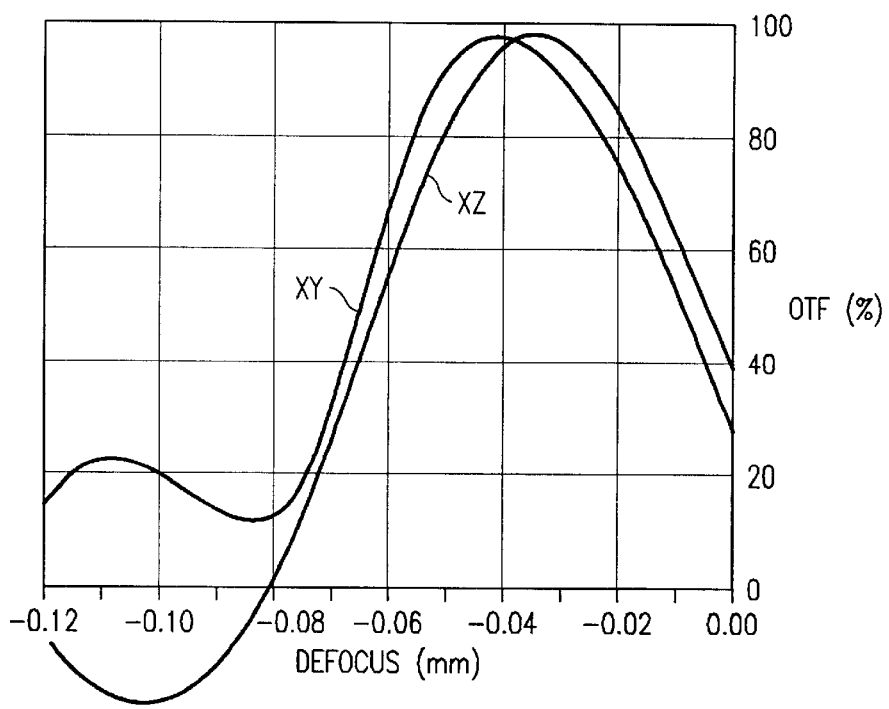
FIG. 8 shows the relationship between the amount of defocus and OTF in the optical system of FIG. 7.
Figure 10:
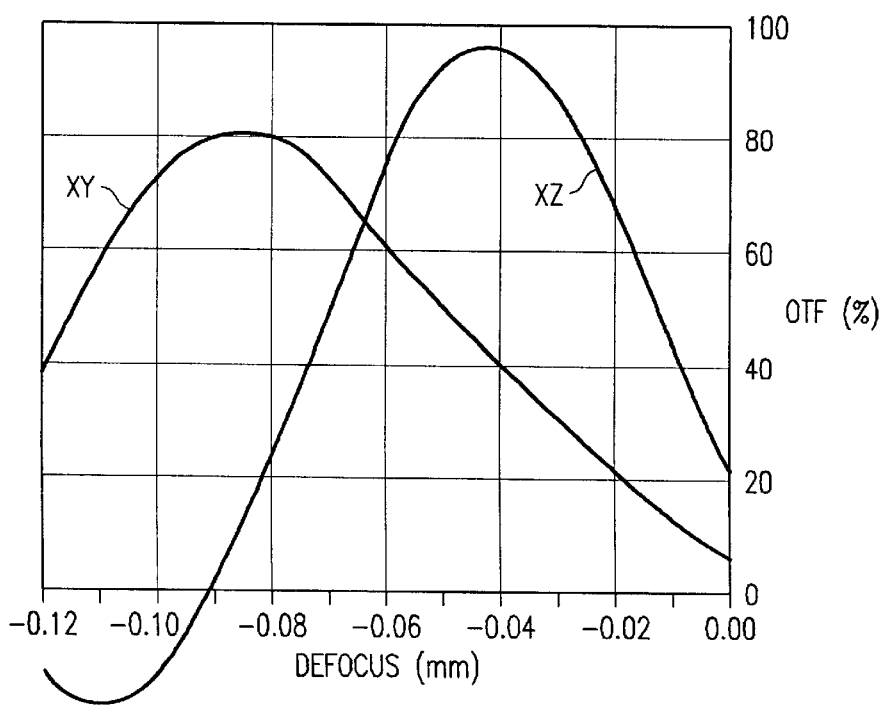
FIG. 10 shows the relationship between the amount of defocus and OTF in the optical system of FIG. 9.
Figure 9:
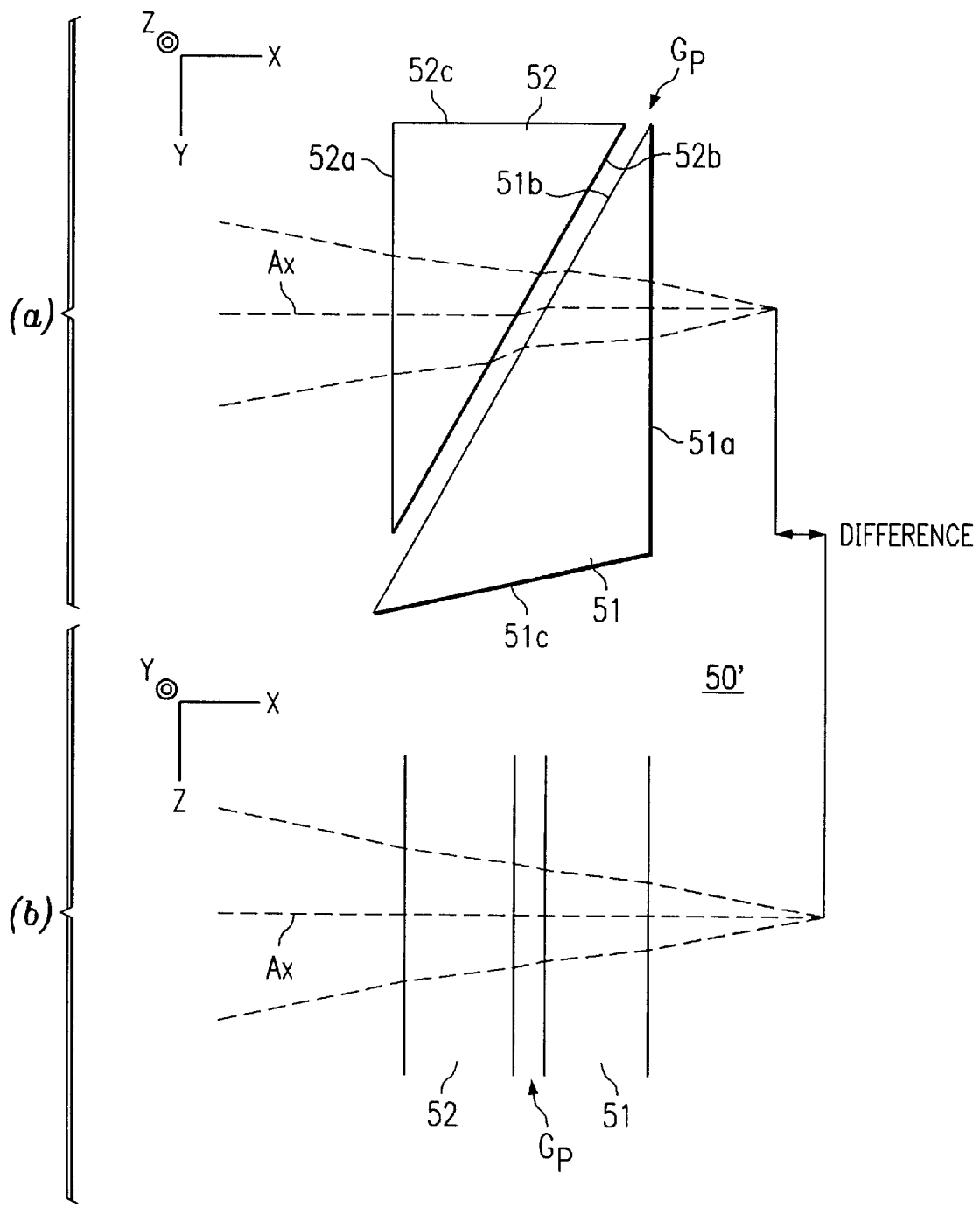
FIG. 9 is a schematic view representing mutually perpendicular cross sections of the structure of a conventional optical system having a large air gap.

The structure of an optical system 3 forming an essential part of a second embodiment of a projection-type image display system is schematically shown in FIGS. 6(a) and 6(b). FIG. 6(a) shows a top view, and FIG. 6(b) shows a side view of the optical system 3. The optical system 3 comprises five prisms 31, 32, 33, 34, and 35. Prisms 31 and 32 are indentical to prisms 11 and 12 of optical system 1 of FIG. 1, and surfaces 31b and 32b form a small air gap G having a wedge-shaped cross section between surfaces 31b and 32b.

Prism 33 has surfaces 33a and 33b which form an acute angle therebetween. Surface 33a is parallel to the surface 31a of the prism 31. Prism 34 has surfaces 34a and 34b which form an acute angle therebetween. Similarly, prism 35 has surfaces 35a and 35b which form an acute angle therebetween. The surface 35a of the prism 35 is approximately parallel to the surface 31a of prism 31.

Prisms 33, 34 and 35 are arranged so as to form a small air gap G1 having a wedge-shaped cross section between surfaces 33b and 34a, and to form a small air gap G2 having a wedge-shaped cross section between the surfaces 34b and 35b. The planes perpendicular to the air gaps G1 and G2 intersect a plane perpendicular to the air gap G. Prism 31 and prism 35 are adjacent to each other, and surfaces 31a and 35a form a small air gap G3 of approximately uniform size.

The surface 34a of prism 34 is provided with a dichroic film 36B for reflecting B light and for transmitting light of other wavelengths. Furthermore, the surface 35b of the prism 35 is provided with a dichroic film 36R for reflecting R light and for transmitting light of other wavelengths.

The projection-type image display device of the present embodiment substitutes the overall optical system 3 for the optical system 1 of the projection-type image display device 2 described above, and provides three display elements in place of a single display element so as to display color projection images. Other aspects are identical to the projection-type image display device 2, and their repeated description is omitted.

The three display elements are respectively arranged opposite the surface 33a of the prism 33, the surface 34c of the prism 34, and the surface 35c of the prism 35. Each of these three display elements is a DMD™ or reflective type LCD. The display element 41 opposite the surface 33a displays the G component, the display element 42 opposite the surface 34c displays the B component, and the display element 43 opposite the surface 35c displays the R component, and the light can be modulated by the displayed projection image. Furthermore, the projection optical system is arranged such that the optical axis of the projection optical system is parallel to the optical axis Ax of the optical system 3 on the surface 32a side of the prism 32.

The light for illuminating the display elements is provided to the optical system 3 from the surface 31c of the prism 31. Light entering prism 31 from the surface 31c is completely reflected by the surface 31b, passes through the surface 31a, crosses the air gap G3, and enters the prism 35 from surface 35a, this light reaches the surface 35b, and the R light contained therein is reflected by the dichroic film 36R, and the G light and B light are transmitted through the dichroic film 36R.

The reflected R light impinges the surface 35a at an incidence angle exceeding the critical angle, and is completely reflected. This R light passes through the surface 35c, and illuminates the display element 43 for displaying the R component of the projection image, and this light is modulated, and reflected perpendicularly.

The G light and B light transmitted through the dichroic film 36R crosses the air gap G2, enters the prism 34 from surface 34b, and reaches the surface 34a. The B light is reflected by the dichroic film 36B, and the G light is transmitted through the dichroic film 36B.

The reflected B light impinges the surface 34b at an incidence angle exceeding the critical angle, and is completely reflected. The B light passes through the surface 34c, illuminates the display element 42 for displaying the B component of the projection image, and is modulated and reflected perpendicularly.

The G light transmitted through the dichroic film 36B crosses the air gap G1 and enters the prism 33 from the surface 33b. This G light passes through the surface 33a, illuminates the display element 41 for displaying the G component of the projection image, and is modulated and reflected perpendicularly.

The R light, G light, and B light reversely return through the respective optical path, and enter the prism 31 from the surface 31a. During this time the G light and B light are combined by the dichroic film 36B, and the red light and the combined G light and B light are combined by the dichroic film 36R.

The light representing the projection image entering the prism 31 passes through the surface 31*b*, crosses the air gap G, and passes through the prism 32, and thereafter enters the projection optical system, and a color projection image is displayed on the screen.

Although the air gaps G1 and G2 are formed to permit the dichroic films 36R and 36B in the optical system 3, these air gaps G1 and G2 have a wedge shape, which is narrower at a part thereof nearer the projection optical system, identical to the air gap G, such that no difference is generated in the course of the light from the display elements across the air gaps G1 and G2 in two intersecting directions. Accordingly, the displayed color image is high quality without color shift.

In the optical system of the present invention wherein the air gap between prisms has a wedge shape, the light from an object point at a position on the first surface side is transmitted and does not have a difference in course in two intersecting directions even when the air gap thickness is increased. Accordingly, the optical system is suitable for high intensity light.

The shape of the cross section of the air gap can easily be set by interposing plate-like members of different thicknesses between the second surface and the third surface at different parts, or by adhering adhesive containing particles of different sizes at different parts of the second surface and the third surface.

The generation of a difference in the course of light transmitted through the optical system in two intersecting directions is adequately suppressed for a practical range of distance, between a first surface and an object point at a position on the first surface side, by setting the angle formed by the second surface and the third surface at 0.25° or less.

When the second prism has a fourth surface approximately parallel to the first surface, light from the object point on the first surface side of the optical system can be transmitted without causing angular change in the principal ray, providing an optical system of even simpler structure.

When the structure includes a third prism having a surface approximately parallel to the first surface, and an air gap having a wedge-shaped cross section is formed between the second prism and the third prism, light from an object point on the first surface side of the optical system can be transmitted without angular change in the course of the principal ray, and the use of the two wedge-shaped air gaps improves performance.

When a dichroic film is provided on the farthest surface from a first surface among the two surfaces forming each air gap, light enters the third prism from a surface approximately parallel to the first surface, and this light can be split into light of three wavelength ranges. Moreover, if the split light is modulated and reflected perpendicularly, each modulated light can be combined and emitted from the third prism.

Advantages of the projection-type image display device of the present invention include the aspect of difficulty in generating distortion in the projected light, and an extremely bright and sharp projection image even when high intensity light is used to illuminate the display element.

A color image without color shift is produced by an optical system having three display elements, and dichroic film.

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as being included therein.

What is claimed is:

1. A projection-type image display device comprising:
    a display element for displaying a projection image, and for modulating and reflecting illumination light by the displayed projection image;
    a projection optical system for projecting light modulated by the display element;
    an optical system, disposed medially to the display element and the projection optical system, for directing illumination light to the display element and for directing light modulated by the display element to the projection optical system;
    said optical system comprising:
        a first prism having a first surface and a second surface forming an acute angle therebetween;
        a second prism having a third surface, said first and second prisms being positioned to form an air gap between the second surface and the third surface;
        wherein a cross section of said air gap, perpendicular to the first surface and the second surface has a wedge shape which is wide at a part thereof which is nearest the first surface and is narrower at a part thereof which is more distant from the first surface; and
        wherein the optical system is arranged such that the first surface forms a right angle to an optical axis of the projection optical system, and wherein the second surface is positioned nearer the projection optical system than is the first surface.

2. A projection-type image display device as claimed in claim 1, wherein the second surface and the third surface of the optical system form said air gap by sandwiching therebetween a first plate-like member at a first position near the first surface and a second plate-like member at a second position which is more distant from the first surface than is the first position, said first plate-like member having a thickness which is different from a thickness of said second plate-like member.

3. A projection-type image display device as claimed in claim 1, wherein the second surface and the third surface of the optical system form said air gap by sandwiching therebetween a first particle included in an adhesive at a first position near the first surface and a second particle included in an adhesive at a second position distant from the first surface, said first particle having a size which is different from a size of said second particle.

4. A projection-type image display device as claimed in claim 1, wherein the second surface and the third surface form an angle therebetween within a plane perpendicular to the first surface and the second surface of the optical system, wherein the angle between the second surface and the third surface is 0.25° or less.

5. A projection-type image display device as claimed in claim 1, wherein the second prism of the optical system has a fourth surface which is approximately parallel to the first surface.

6. A projection-type image display device as claimed in claim 1, wherein illumination light is directed to a display element via total reflection by the second surface of the optical system.

7. A projection-type image display device comprising:
    three display elements for respectively displaying projection images of different wavelength, and for modulating and reflecting illumination light by the displayed projection images;

a projection optical system for projecting light modulated by the three display elements;

an optical system, disposed medially to the three display elements and the projection optical system, for splitting illumination light according to wavelength, for directing illumination light to the three display elements, and for combining light modulated by the three display elements and directing the thus combined light to the projection optical system;

said optical system comprising:
- a first prism having a first surface and a second surface forming an acute angle therebetween;
- a second prism having a third surface and a fourth surface forming an acute angle therebetween, said first and second prisms being positioned to form an air gap between the second surface and the third surface;
- a third prism having a fifth surface and a sixth surface, said second and third prisms being positioned to form an air gap between the fourth surface and the fifth surface, wherein said sixth surface is approximately parallel to the first surface, and wherein the air gap formed by the fourth surface and fifth surface has a cross section, perpendicular to the third surface and the fourth surface, which is wedge-shaped so as to be wider at a part thereof near the third surface and be narrower at a part thereof more distant from the third surface;
- wherein the optical system is arranged such that the first surface forms a right angle to an optical axis of the projection optical system, and the second surface is positioned nearer the projection optical system than the first surface;
- wherein the third surface is provided with a first dichroic film to reflect light of a first wavelength range and transmit light other than the first wavelength range; and
- wherein the fifth surface is provided with a second dichroic film to reflect light of a second wavelength range and transmit light other than the second wavelength range.

8. An optical system for use in a projecting system, the projecting system having a display element and a projection optical system, the optical system disposed medially to the display element and the projection optical system, the optical system for directing illumination light to the display element and for directing light modulated by the display element to the projection optical system, the optical system comprising:
- a first prism having a first surface and a second surface forming an acute angle therebetween;
- a second prism having a third surface, said first and second prisms being positioned to form an air gap between the second surface and the third surface;
- wherein a cross section of said air gap, perpendicular to the first surface and the second surface, has a wedge shape which is wide at a part thereof which is near the first surface and is narrower at a part thereof which is more distant from the first surface.

* * * * *